United States Patent [19]

Atsukawa et al.

[11] 4,107,271
[45] Aug. 15, 1978

[54] WET-TREATMENT OF EXHAUST GASES

[75] Inventors: Masumi Atsukawa; Naoharu Shinoda; Takeji Tanaka, all of Hiroshima, Japan

[73] Assignee: Mitsubishi Jukogyo Kabushiki Kaisha, Tokyo, Japan

[21] Appl. No.: 690,785

[22] Filed: May 27, 1976

[30] Foreign Application Priority Data

Jun. 6, 1975 [JP] Japan ................................ 50-67467

[51] Int. Cl.$^2$ ............................................. C01B 21/00
[52] U.S. Cl. .................................. 423/235; 423/242; 423/506
[58] Field of Search ............... 423/235, 239, 247, 500, 423/504, 505, 506

[56] References Cited

U.S. PATENT DOCUMENTS

| 1,708,287 | 4/1929 | Turrentine | 423/505 |
| 1,944,423 | 1/1934 | Girvin | 423/500 |
| 2,282,289 | 5/1942 | Robinson | 423/504 |
| 2,385,483 | 9/1945 | Wolff | 423/500 |
| 3,044,862 | 7/1962 | Paull | 423/500 |
| 4,009,244 | 2/1977 | Atsukawa et al. | 423/235 |
| 4,038,367 | 7/1977 | Atsukawa et al. | 423/235 |
| 4,038,368 | 7/1977 | Atsukawa et al. | 423/235 |

FOREIGN PATENT DOCUMENTS 2,524,115  12/1975  Fed. Rep. of Germany ........... 423/235

OTHER PUBLICATIONS

Chem. Abstr., vol. 37, 1943, col. 3999 & 4000, #8-9-1.

*Primary Examiner*—O. R. Vertiz
*Assistant Examiner*—Eugene T. Wheelock
*Attorney, Agent, or Firm*—Cushman, Darby & Cushman

[57] ABSTRACT

A process for the wet-treatment of an exhaust gas in which nitrogen oxide and sulfur oxide contained in the exhaust gas are removed by use of an absorbent comprising a lime slurry containing an alkali metal or alkaline earth metal iodide, wherein an oxidizing agent is supplied to at least a part of iodide containing liquid retrieved from the wet-treatment to oxidize the iodide and thereby recover said iodide as iodine.

3 Claims, 1 Drawing Figure

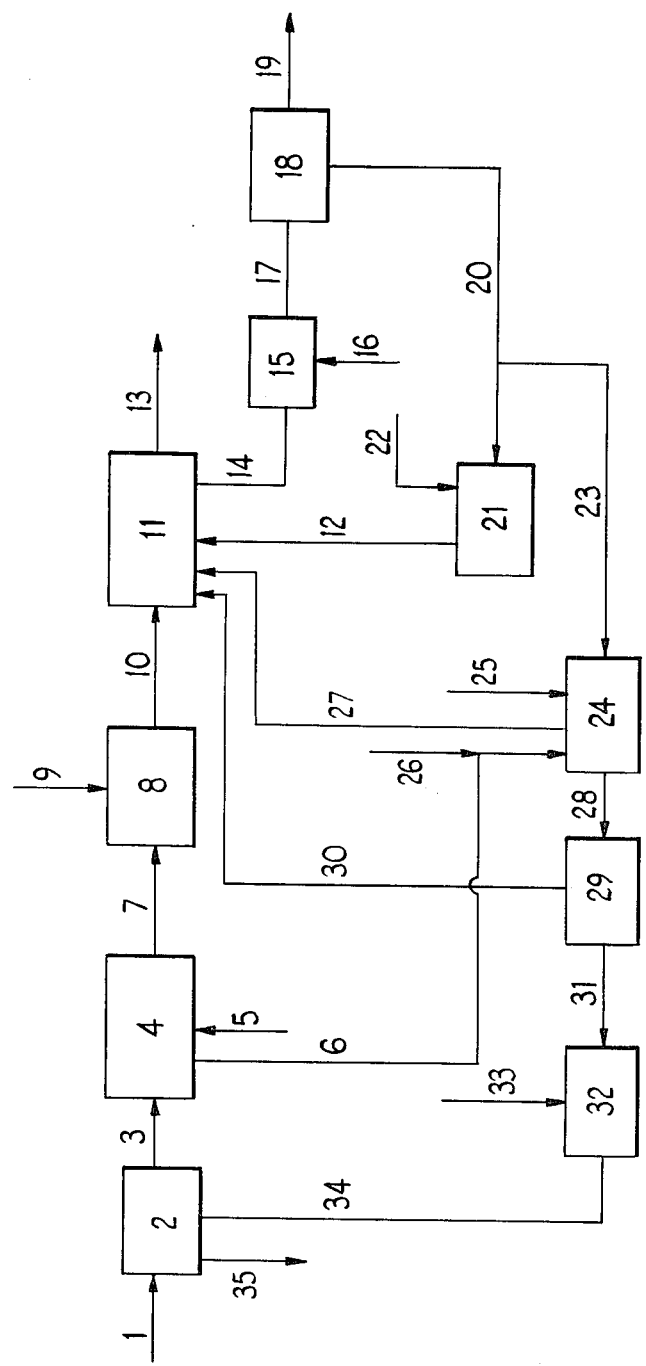

WET-TREATMENT OF EXHAUST GASES

The present invention relates to processes for treating exhaust gases to remove nitrogen oxides ($NO_x$) and sulphur oxides ($SO_2$) contained in said gases by using an absorbent comprising a lime or limestone slurry containing an alkali metal or alkaline earth metal iodide.

After removal of $NO_x$ and $SO_2$, the absorbed exhaust slurry is normally separated into solid and liquid phases. The solid phase is removed from the process, and the separated liquid is re-circulated through the process for the preparation of the lime or limestone slurry. However, impurities such as $Cl^-$ present in the exhaust gas being processed, or lime material, gradually accumulate in the re-circulated liquid in the lime or limestone slurry and can result in the corrosion of the process apparatus. Because of this, part of said recirculated liquid is normally removed from the process by blowing to prevent or at least reduce the accumulation of these impurities. However, because the alkali metal, or alkaline earth metal iodide is dissolved in the liquid, the alkali metal or alkaline earth metal iodide is also blown from the process, with a consequent harmful effect on the economics of the process.

An object of the present invention is the effective recovery of the alkali metal or alkaline earth metal iodide dissolved in the blown re-circulated liquid.

The invention aims to recover iodide from treated exhaust liquid, and also relates to processes for the after-treatment of the exhaust liquid after recovery of iodide.

According to the present invention, in a process for the wet-treatment of an exhaust gas in which nitrogen oxide and sulphur oxide contained in the exhaust gas is removed by the use of an absorbent comprising a lime or limestone slurry containing an alkali metal or alkaline earth metal iodide, an oxidizing agent is supplied to at least a part of iodide containing liquid retrieved from the wet-treatment whereby to oxidize the iodide and recover said iodide as iodine.

According to a feature of the invention, said retrieved liquid, after recovery of iodine, is heated and concentrated to obtain coagulated matters.

According to another feature of the invention, iodine recovered from said retrieved liquid is reconverted to said iodide in the gas washing apparatus.

In one application of the invention, a part of the retrieved liquid blown from the process is at first introduced into reaction apparatus, and an oxidizing agent such as ozone, hydrogen peroxide and chlorine is simultaneously supplied to said reaction apparatus.

The iodide ($I^-$) dissolved in the blown liquid is thereby oxidized as shown in the following formulae by the aforesaid respective oxidizing agents to become free iodine ($I_2$).

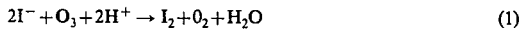  (1)

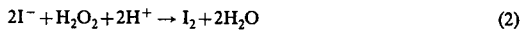  (2)

  (3)

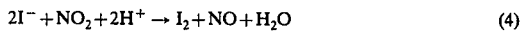  (4)

In the case where ozone is used as the oxidizing agent, an ozone-containing gas prepared by a silent, discharge-type ozone generator is used. The reaction equivalent of formula (1) determines the amount of ozone to be used. When hydrogen peroxide is used, industrial aqueous hydrogen peroxide ($H_2O_2$ with a concentration of about 30%) will suffice and when the reaction equivalent (of $H_2O_2$) of formula (2) is supplied, about 100% of $I^-$ is oxidized to $I_2$. In the case where $Cl_2$ gas is used, about the equivalent of $Cl_2$ is supplied from a bomb and $I^-$ is oxidized to $I_2$ in accordance with formula (3). Use of $NO_2$ as the oxidizing agent is similarly effective. In each case, the reaction proceeds faster in an acidic zone, however, the pH value may be neutral or weakly acidic by the addition of sulfuric acid.

Thus, liquid extracted from the reaction apparatus contains free iodine ($I_2$), and this is fed to a solid phase - liquid phase separating apparatus. Because free iodine is generally low in solubility, a greater part of $I_2$ separates in a solid phase and is then separated into a liquid phase and a solid phase in the separating apparatus. A centrifuge or precipitate concentrating apparatus may be used as the separating apparatus, for example. In each case, $I_2$ is fractionated into what consists mainly of solid phase $I_2$ and a separated liquid. That fraction which consists mainly of the solid phase $I_2$ is re-circulated in the processs system and the separated liquid remains as that part of the liquid to be blown.

Alternatively, in the case where gases such as ozone, $NO_2$ and $Cl_2$ are used as the oxidizing agent, the gas is extracted from the reaction apparatus. However, because $I_2$ is present in this gas, said gas is introduced into gas washing apparatus, where the $I_2$ is recovered.

The so recovered $I_2$ is reduced by sulfurous acid and lime sulfite, produced upon absorbing and recovering $NO_x$ and $SO_2$, with a lime or limestone slurry containing an alkali metal or alkaline earth metal iodide in accordance with the following formula and returned into the absorbing liquid as $I^-$ again.

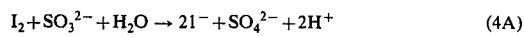  (4A)

Thus, a process for introducing $I_2$ contained in a gas extracted from the reaction apparatus to the gas washing apparatus for treating the exhaust gas and converting $I_2$ to $I^-$ by the reaction of the aforesaid reaction formula (4A), is more effective. It is preferable to feed a portion obtained as solid phase $I_2$ from the separating apparatus to, for example, the liquid storing portion of said gas washing apparatus to convert it to $I^-$ therein.

Next, the separated liquid (separated liquid if a centrifuge is used and supernatant if a precipitate concentrating apparatus is used from which a greater part of the solid phase $I_2$ is fractionated is a liquid to be blown. However, it contains small amounts of impurities such as $Cl^-$ as mentioned above. Further, in an absorbing liquid for treating an exhaust flue gas according to the present invention there are contained calcium salts of nitrogen compounds of the hydroxylamine series such as NOH $(SO_3)_2Ca$ and $[N(SO_3)_3]_2Ca_3$, which are similarly contained in the separated liquid. Accordingly, it is possible to treat said separated liquid according to a process which comprises neutralizing this blowing liquid to neutral or weak acidic so that $Cl^-$ contained in said blowing liquid will not be converted to $Cl_2$ gas or HCl gas. Thereafter, the process comprises heating said blowing liquid to evaporate moisture, separating and coagulating $Cl^-$ and a sodium salt and/or calcium salt of nitrogen compounds of the hydroxylamine series and sulfamine series contained in the liquid, and treating these as solid waste matters. Utilization of the heat of the exhaust gas to be treated for this process is preferred to increase efficiency. A boiler exhaust gas normally has a temperature within the range of 100°–200° C before it enters exhaust flue gas treatment apparatus, into which water is fed to humidify and cool said gas. By utilizing the heat of said treated exhaust gas, a reduction in the amount of feed water for humidification and cooling results, and a reduction in the size of the treatment apparatus is possible.

The present invention will be illustrated by an example thereof which will be disussed in detail with reference to the accompanying drawing, which is a flow diagram of the process system.

A gas to be treated, for example, the exhaust gas of a boiler burning heavy oil at a temperature of approximately 150° C, is fed, via a line 1, firstly into heating and concentrating apparatus 2. In this apparatus part of the heat of said gas is given up to heat a neutralizing liquid to be discussed hereinafter and to evaporate water fed thereto. The gas is then passed, via a line 3, to cooling and dusting apparatus 4 where said gas is humidified and cooled to a temperature close to the saturation temperature of the moisture. At the same time, a greater part of dust contained in the gas is removed. In said cooling and dusting apparatus 4, $SO_3$ and a part of $SO_2$ present in the gas is oxidized to sulfuric acid, and, thereafter, the pH value of a liquid exhausted from the apparatus 4, via a line 6, falls to approximately 1–2. The water used for humidification is supplied via a line 5. Part of the liquid from which dust has been removed is extracted from the line 6 as an exhausted liquid and is introduced into reaction apparatus 24 to be discussed hereinafter. The remainder of the gas exhausting from the cooling and dusting apparatus 4 passes into NO oxidizing apparatus 8 via line 7, in which apparatus 8 the gas is reacted with an oxidizing agent, for example, ozone or $HNO_3$, to oxidize NO in the gas to $NO_2$.

$$NO + O_3 \rightarrow NO_2 + O_2 \qquad (5)$$

$$NO + 2HNO_3 \rightarrow 3NO_2 + H_2O \qquad (6)$$

The treated gas in which NO has been oxidized to $NO_2$ is introduced into gas washing apparatus 11 via a line 10, and a lime or limestone slurry absorbing liquid containing, for example, calcium iodide is supplied to apparatus 11 via a line 12. $NO_2$ and $SO_2$ in the gas are absorbed and removed according to the following formulae.

$$CaI_2 + 2NO_2 \rightarrow Ca(NO_2)_2 + I_2 \qquad (7)$$

$$CaCO_3 + SO_2 + \tfrac{1}{2}H_2O \rightarrow CaSO_3 \cdot \tfrac{1}{2}H_2O + CO_2 \qquad (8)$$

$$CaCO_3 + 2SO_2 + H_2O \rightarrow Ca(HSO_3)_2 + CO_2 \qquad (9)$$

$$CaSO_3 \cdot \tfrac{1}{2}H_2O + I_2 + CaCO_3 + 3/2H_2O \rightarrow \\ CaI_2 + CaSO_4 \cdot 2H_2O + CO_2 \qquad (10)$$

$$3Ca(HSO_3)_2 + Ca(NO_2)_2 \rightarrow 2HON\\(SO_3)_2Ca + 2CaSO_3 \cdot \tfrac{1}{2}H_2O + H_2O \qquad (11)$$

$$2HON(SO_3)_2Ca + Ca(HSO_3)_2 \rightarrow \\ [N(SO_3)_3]_2Ca_3 + 2H_2O \qquad (12)$$

$$[N(SO_3)_3]_2Ca_3 + Ca(NO_2)_2 + 6H_2O \rightarrow \\ 2N_2 + 2CaSO_4 \cdot 2H_2O + 2Ca(HSO_4)_2 \qquad (13)$$

$$2CaCO_3 + 2Ca(HSO_4)_2 + 6H_2O \rightarrow \\ 4CaSO_4 \cdot 2H_2O + 2CO_2 \qquad (14)$$

Thus, $NO_2$ in the gas is absorbed by calcium iodide $CaI_2$ in the absorbing liquid according to formula (7) to become calcium nitrite $Ca(NO_2)_2$. On the other hand, the iodide becomes free iodine $I_2$. This free iodine $I_2$ immediately reacts with lime sulfite $CaSO_3 \cdot \tfrac{1}{2}H_2O$ to become $CaI_2$ again according to formula (10), above, thereby acting as a catalyst without a change in its stoichiometry. On the other hand, $SO_2$ in the gas reacts with lime to become lime sulfite $CaSO_3 \cdot \tfrac{1}{2}H_2O$ or lime bisulfite $Ca(HSO_3)_2$ according to formula (8) and (9), above. Next, this $CaSO_3 \cdot \tfrac{1}{2}H_2O$ reacts with $Ca(NO_2)_2$ according to formula (11), above to become calcium hydroxylamine disulfonate $HON(SO_3)_2Ca$, which in turn reacts with $Ca(HSO_3)_2$ according to formula (12), above to become calcium nitrilo trisulfonate $[N(SO_3)_3]_2Ca_3$. This $[N(SO_3)_3]_2Ca_3$ reacts with $Ca(NO_2)_2$ according to formula (13), above to generate $N_2$, and calcium bisulfate $Ca(HSO_4)_2$ produced on that occasion is neutralized with lime to become gypsum $CaSO_4 \cdot 2H_2O$ according to formula (10).

Clean gas with $NO_x$ and $SO_2$ removed therefrom is discharged into the atmosphere from a line 13 via a chimney. The pH value of the absorbing liquid in the gas washing apparatus 11 is preferably 4.0–6.0 and at that time, the main components in the absorbing liquid are $CaSO_3 \cdot \tfrac{1}{2}H_2O$, $CaSO_4 \cdot 2H_2O$, $HON(SO_3)_2Ca$, $[N(SO_3)_3]_2Ca_3$ and $CaI_2$. Should the concentration of $SO_2$ in the gas be relatively low, the concentration said $CaSO_3 \cdot \tfrac{1}{2}H_2O$ is low. However, in the case where the concentration of $SO_2$ in the gas is relatively high (at least about 1000 ppm), $CaSO_3 \cdot \tfrac{1}{2}H_2O$ is relatively high in the absorbing liquid. The absorbing liquid is introduced to a $CaSO_3 \cdot \tfrac{1}{2}H_2O$ oxidizing apparatus 15 via a line 14. On the other hand, in said apparatus 15, $CaSO_3 \cdot \tfrac{1}{2}H_2O$ is oxidized by oxygen or air supplied via a line 16 and converted to $CaSO_4 \cdot 2H_2O$ (gypsum). The gypsum solution is then introduced via a line 17 to gypsum separating apparatus 18, and the separated gypsum is removed via a line 19. A greater part of the separated liquid is fed via a line 20 to absorbing liquid adjusting apparatus 21, where it is mixed with lime or limestone material supplied via a line 22 and repeatedly used as an absorbing liquid via a line 12. Because $CaI_2$ is dissolved in the liquid, it is repeatedly used together with this liquid.

However, traces of impurities from the gas to be treated supplied via the lime 1 and the lime or limestone material supplied via the lime 22 gradually accumulate in this absorbing liquid. In order to prevent this accumulation, a part of the separated liquid flowing through the line 20 (i.e. iodide containing liquid retrieved from the wet-treatment) is extracted and introduced to the reaction apparatus 24 via a line 23. To this reaction apparatus 24 is supplied an oxidizing agent in an amount approximately equivalent to the amount of $CaI_2$ in the separated liquid introduced via a line 25 to oxidize $CaI_2$ to free iodine $(I_2)$.

$$O_3 + CaI_2 + H_2SO_4 + H_2O \rightarrow I_2 + O_2 + CaSO_4 \cdot 2H_2O \qquad (15)$$

$$H_2O_2 + CaI_2 + H_2SO_4 \rightarrow I_2 + CaSO_4 \cdot 2H_2O \qquad (16)$$

$$Cl_2 + CaI_2 \rightarrow I_2 + CaCl_2 \qquad (17)$$

As the oxidizing agent, ozone generated by a silent discharge process, or aqueous hydrogen peroxide, and $Cl_2$ are effective. In formulae (15), (16), a stoichiometric amount of sulfuric acid is necessary as mentioned above. This sulfuric acid may be prepared separately. However, it is preferable to utilize sulfuric acid in the extracted liquid obtained from the cooling and dusting apparatus 4 via the line 6 and to supply a small additional amount via a line 26. Because free iodine has low solubility in the liquid, a greater part thereof is in the gaseous phase or solid phase $I_2$. The gas containing gaseous $I_2$ in the reaction apparatus 24 passes to the gas washing apparatus 11 via a line 27, where it is washed with the absorbing liquid, and $I_2$ is thereby recovered.

The liquid extracted from the reaction apparatus 24 is fed via a line 28 to separating apparatus 29, where $I_2$ in the liquid is separated. Solid phase $I_2$ is returned to the gas washing apparatus 11 via a line 30 in the same manner as the gas containing gaseous phase $I_2$, in which apparatus 11, $I_2$ is converted to $CaI_2$. The separated liquid extracted from the separating apparatus 29 is fed to neutralizing apparatus 32 via a line 31, to which apparatus 32 is supplied an aqueous solution of caustic soda or lime slurry via a line 33 so that the pH value of the liquid becomes neutral or alkali. When the separated liquid is acidic, $Cl^-$ in the liquid may be deionized and given off in a gaseous state as $Cl_2$ or HCl. Therefore, caustic soda or lime slurry is supplied in order to prevent this. The separated liquid with adjusted pH value is then fed from the neutralizing apparatus 32, via a line 34, to the heating and concentrating apparatus 2, where the separated liquid is heated to evaporate moisture and concentrated. Also, NaCl and/or $CaCl_2$ and $HON(SO_3)_2 Ca$, $[N(SO_3)_3]_2Ca_3$ and other impurities dissolved in the separated liquid or gypsum produced by neutralization are caused to separate and coagulate. The heat source for the apparatus 2 may be steam or a high temperature gas. However, it is most effective to utilize the heat of the gas to be treated. Coagulated matters extracted from the heating and concentrating apparatus 2, via a line 35, may be further dried if necessary and discarded or utilized for land reclamation.

EXAMPLE 1

100 $Nm^3/h$ of a combustion exhaust gas at 135° C containing 150 ppm of NO, 450 ppm of $SO_2$, 4.5% by volume of $O_2$ and 9.0% by volume of $CO_2$ was selected as a gas to be treated. For testing, cooling and dusting apparatus 4 (spray system, diameter 0.2 m, height 1.5 m) and gas absorbing apparatus 11 (diameter 0.2 m, height 1.5 m, packed column) were used. As an absorbing liquid from the line 12, a slurry containing 5% by weight of $CaI_2$ and 5% by weight of $CaCO_3$ was used.

The gas to be treated was first of all cooled and humidified to about 55° C in the cooling and dusting apparatus. Thereafter, but before said gas passed to the gas absorbing apparatus 11, it was mixed with about 32 g/sec of a gas containing ozone (generated by a silent discharge ozone generator) and then fed to the apparatus 11. The absorbing liquid was continuously supplied to adjust the pH value of the liquid to 5.0.

After it was judged that a stationary state had been achieved, 30 minutes were allowed to elapse and the concentrations of NO, $NO_2$ and $SO_2$ at the exit of the absorbing apparatus were checked and were as follows:

| NO | about | 5 | ppm |
|---|---|---|---|
| $NO_2$ | " | 35 | " |
| $SO_2$ | " | 23 | " |

On the other hand, after the absorbed absorbing liquid had been oxidized with air in the oxidizing apparatus 15, gypsum was separated by a small basket-type centrifuge 18 and 2 litres of the separated liquid was collected as a test specimen. Test (1) One liter of the test specimen of separated liquid was placed in the reaction apparatus 24 and the corresponding gas ventilation-type stirring vessel (diameter 0.1 m, height 0.3m, bubble column), to which approximately 2.5 g/hr of a gas containing ozone was fed from an ozone generator. At the same time, an aqueous solution of 5 N $H_2SO_4$ was added dropwise to the liter of separated liquid so as to adjust the pH value of the liquid to 5.5-6.0. The gas extracted from the stirring vessel was fed to a gas washing bottle containing 200 cc each of 3 mol/liter of $Na_2SO_3$ and an aqueous solution to collect free $I_2$ accompanied in said gas.

About 4 hours after the test was started, $I^-$ and $I_2$ in the remaining liquid in the stirring vessel and $I_2$ collected in the gas washing bottle were analyzed, and the results were as follows.

| | |
|---|---|
| $I^-$ in the liquid | 0.001 mol/liter |
| $I_2$ in the liquid | 0.05 mol/liter |
| $I_2$ collected in the gas washing bottle | 0.115 mol/liter |

Test (2) The remaining liter of the test specimen of separated liquid was placed inside a 2-liter beaker, to which 20 cc of a 30% aqueous solution of $H_2O_2$ was gradually added dropwise with vigorous stirring. Further, an aqueous solution of sulfuric acid (3 N $H_2SO_4$) was similarly added dropwise to said separated liquid so as to adjust the pH value of the liquid to 5-5.5. After completion of this operation, the remaining $I^-$ and free $I_2$ in the liquid were measured and the following results were obtained.

| | |
|---|---|
| Remaining $I^-$ in the liquid | about 0 |
| Remaining $I_2$ in the liquid | 0.16 mol/liter |

$I_2$ becoming free in the liquid of test (2) was filtered and separated by filter paper (standard 5A) and 500 ml of the filtrate were taken and made a test specimen.

To the filtrate test specimen was added 0.1 g of NaCl, to which 0.1 N NaOH was added dropwise so as to adjust the pH value of the liquid to 8.0 whilst stirring to neutralize the liquid. Thereafter, this test specimen was transferred to an evaporating dish to evaporate moisture by a dryer at 105° C to dry and solidify the test specimen. The results of the qualitative analysis of solids remaining on the evaporating dish were as follows.

| | |
|---|---|
| Cl compound (as NaCl) | about 0.1 g |
| $CaSO_4 \cdot 2H_2O$ | about 1.03 g |
| N compound (as [$HON(SO_3)_2 Ca$]) | about 3.21 g |

What we claim is:

1. In a process for the aqueous absorption treatment of an exhaust gas to remove simultaneously both oxides of nitrogen ($NO_x$) and oxides of sulphur ($SO_x$) from the exhaust gas, wherein the process comprises washing and contacting the exhaust gas with a slurry of lime or limestone, containing an aqueous solution of an alkali metal iodide, alkaline earth metal iodide or mixture of alkali metal iodide and alkaline earth metal iodide, (a) wherein said lime or limestone slurry reacts with ($SO_x$) thereby removing the sulphur oxides from the exhaust gas and (b) wherein said alkali metal iodide, alkaline earth metal iodide or mixture of alkali metal iodide and alkaline earth metal iodide remove (NO$_x$) from the exhaust gas;
the improvement comprising
(1) treating at least a portion of the aqueous solution of alkali metal iodide, alkaline earth metal iodide, or mixture of alkali metal iodide and alkaline metal iodide, after the aqueous solution contacts said exhaust gas in (a) and (b), with an amount of an oxidizing agent selected from the group consisting of chlorine, ozone, hydrogen peroxide, or nitrogen dioxide effective to convert substantially all iodide to iodine, said iodine being in the form of a gas or a solid,
(2) separating said iodine from the aqueous solution resulting from treatment with said oxidizing agent and recovering iodine;
(3) and further processing said iodine and the separated aqueous solution of (2)
(i) by reducing said recovered iodine with an agent selected from the group consisting of sulphurous acid, lime sulphite and mixtures thereof to regenerate iodide,
wherein said regenerated iodide is mixed with lime or limestone slurry and recycled for use in (a) and (b) to remove both oxides of nitrogen (NO$_x$) and oxides of sulphur (SO$_x$) from said exhaust gas, and
(ii) by neutralizing said separated aqueous solution, heating and concentrating said separated aqueous solution by a high temperature exhaust gas before said gas enters an exhaust gas cooling and dusting apparatus to remove impurities comprising NaCl, CaCl$_2$, HON(SO$_3$)$_2$Ca, [N(SO$_3$)$_3$]$_2$Ca$_3$ or mixures thereof which are contained in the liquid to convert them into solid waste materials.

2. The process of claim 1, wherein said oxidizing agent is ozone or hydrogen peroxide.

3. In a process for the aqueous absorption treatment of an exhaust gas to remove simultaneously both oxides of nitrogen (NO$_x$) and oxides of sulphur (SO$_x$) from the exhaust gas, wherein the process comprises washing and contacting the exhaust gas with a slurry of lime or limestone, containing an aqueous solution of an alkali metal iodide, alkaline earth metal iodide or mixture of alkali metal iodide and alkaline earth metal iodide, (a) wherein said lime or limestone slurry reacts with (SO$_x$) thereby removing the sulphur oxides from the exhaust gas and (b) wherein said alkali metal iodide, alkaline earth metal iodide or mixture of alkali metal iodide and alkaline earth metal iodide remove (NO$_x$) from the exhaust gas;
the improvement comprising
(1) treating at least a portion of the aqueous solution of alkali metal iodide, alkaline earth metal iodide or mixture of alkali metal iodide and alkaline metal iodide, after the aqueous solution contacts said exhaust gas in (a) and (b), with an amount of an oxidizing agent selected from the group consisting of chlorine, ozone, hydrogen peroxide, or nitrogen dioxide effective to convert substantially all iodide to iodine, said iodine being in the form of a gas or a solid,
(2) separating said iodine from the aqueous solution resulting from treatment with said oxidizing agent and recovering iodine;
(3) and further processing said iodine and the separated aqueous solution of (2)
(i) by reducing said recovered iodine with an agent selected from a group consisting of sulphurous acid, lime sulphite and mixtures thereof to regenerate iodide,
wherein said regenerated iodide is mixed with lime or limestone slurry and recycled for use in (a) and (b) to remove both oxides of nitrogen (NO$_x$) and oxides of sulphur (SO$_x$) from said exhaust gas, and
(ii) by discharging at least a portion of said separated aqueous solution which is substantially free of iodine and iodide from the process system in which steps (a) and (b) are undertaken, wherein said discharging acts to prevent accumulation of impurities comprising NaCl, CaCl$_2$, HON(SO$_3$)$_2$Ca, [N(SO$_3$)$_3$]$_2$Ca$_3$ or mixtures thereof.

* * * * *